United States Patent [19]

Smith

[11] Patent Number: 4,619,348
[45] Date of Patent: Oct. 28, 1986

[54] COMBINED HYDROPNEUMATIC BRAKE CYLINDER/AIR RESERVOIR DEVICE WITH AUTOMATIC DOUBLE-ACTING SLACK ADJUSTER ARRANGEMENT

[75] Inventor: Eric G. Smith, Burlington, Canada

[73] Assignee: WABCO Ltd., Hamilton, Canada

[21] Appl. No.: 603,810

[22] Filed: Apr. 18, 1984

[51] Int. Cl.⁴ .......................................... F16D 65/72
[52] U.S. Cl. ..................... 188/351; 138/196 A; 138/153 R; 138/198; 60/562; 60/592; 60/588
[58] Field of Search ............ 188/196 A, 34 J, 153 R, 188/347, 348, 351, 198; 303/33; 60/562, 585, 586, 589, 590–593, 577, 578, 588

[56] References Cited

U.S. PATENT DOCUMENTS

| | | | |
|---|---|---|---|
| 2,345,811 | 3/1944 | Harp | 188/351 |
| 2,569,025 | 9/1951 | Schultz | 60/588 |
| 3,499,287 | 3/1970 | Schrader | 188/345 |
| 3,637,054 | 1/1972 | Billeter | 188/196 A |
| 3,990,241 | 11/1976 | Owens | 60/592 |
| 4,319,671 | 3/1982 | Smith et al. | 188/196 A |
| 4,339,155 | 7/1982 | Hart | 303/33 |
| 4,405,182 | 9/1983 | Hart | 303/33 |
| 4,471,614 | 9/1984 | Hart | 60/593 |
| 4,494,631 | 1/1985 | Billeter | 188/196 A |

*Primary Examiner*—Bruce H. Stoner, Jr.
*Assistant Examiner*—Alvin E. Oberley
*Attorney, Agent, or Firm*—G. J. Falce

[57] ABSTRACT

A combined hydropneumatic brake cylinder/air reservoir device having a hydraulic piston formed on the end of a push rod through which interconnected, different sized, pneumatic pistons operate to transmit the desired brake force. The hydraulic piston operates in a hydraulic cylinder having a slack adjuster piston arranged to supply or reduce the hydraulic fluid in the braking circuit in order to compensate for overtravel and undertravel of the pneumatic piston assembly due to brake shoe wear and brake shoe replacement respectively. The double-acting slack adjuster action results in the stroke of the pneumatic piston assembly being maintained constant to assure continued optimum operating efficiency.

8 Claims, 1 Drawing Figure

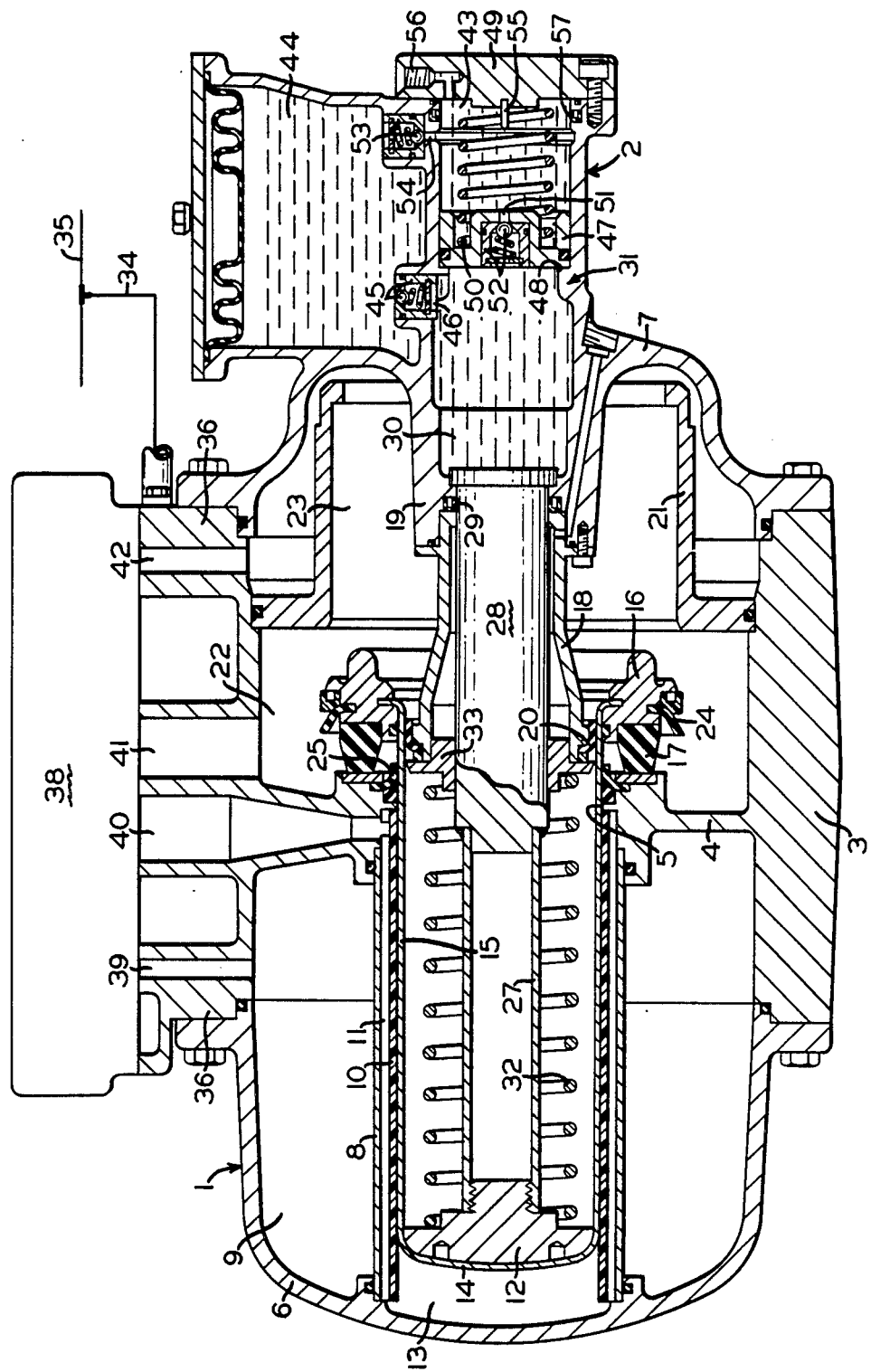

COMBINED HYDROPNEUMATIC BRAKE CYLINDER/AIR RESERVOIR DEVICE WITH AUTOMATIC DOUBLE-ACTING SLACK ADJUSTER ARRANGEMENT

BACKGROUND OF THE INVENTION

The present invention is related to hydropneumatic type actuators, and more particularly to brake actuators of the above type, which are suitable for use in freight type railway brake systems.

At the present time, railroads typically employ traditional automatic air brake systems. Each car in a train is normally equipped with auxiliary and emergency reservoirs which are charged with compressed air from a brake pipe extending through the train, and a control valve which responds to changes in the brake pipe pressure to control the flow of compressed air to and from the car brake cylinders. Since the railroad industry has standardized on relatively low braking pressures, and practical considerations limit the size of the car brake cylinders, it has become necessary to employ force-multiplying linkages between the brake cylinder and brake shoes in order to obtain the high braking forces required. Such brake rigging arrangements inherently increase the stroke of the brake cylinder piston required to move the brake shoes enough to take up the clearance space between the brake shoes and wheel treads. Accordingly, the piston stroke required to bring the shoes into wheel contact, must be relatively large and thus consumes a considerable amount of air. This in turn requires relatively large air reservoirs, which are space-consuming and thus impose a further restriction on the area needed for the force-multiplying brake rigging.

The gradual acceptance of hydraulic brake systems in the rapid transit segment of the railway industry suggests the possibility of using hydraulics as a means of transmitting brake forces to the brake shoes in freight type service. Such an approach would be advantageous in eliminating the need for the cumbersome, mechanical brake rigging presently employed on freight cars to transmit the brake cylinder forces to the brake shoes. Ideally, such an arrangement would require only a single hydropneumatic actuator device on each car corresponding to the brake cylinder in a conventional mechanical brake rigging system. Mechanical advantage sufficient to obtain the desired high brake shoe forces would be obtained by a high ratio input to output hydropneumatic piston of the actuator device. Because of this high input to output ratio and the brake shoe clearance to be taken up, the stroke of the actuator piston in the pneumatic actuator portion would be necessarily large, and thus require a considerable amount of air simply to bring the brake shoes into braking engagement with the wheel treads.

SUMMARY OF THE INVENTION

The object of the present invention is to provide a compact, low-cost, yet highly reliable hydropneumatic actuator device having a two-stage pneumatic actuator portion to reduce the air required to take up the clearance between the brake shoes and wheel treads of a railway vehicle.

Another object of the invention is to provide a hydropneumatic actuator of the above type, which automatically compensates for variations in the clearance between the brake shoes and wheel treads due to brake shoe wear or replacement, for example, in order to maintain the desired stroke of the pneumatic piston substantially constant to assure optimum operation of the two-stage pneumatic actuator portion.

Briefly, the hydropneumatic actuator according to the present invention converts an input force, such as the pneumatic output of an air brake control valve device, into a proportionally higher hydraulic pressure. During the first stage of operation, a relatively small pneumatic piston drives a hydraulic piston through a distance corresponding to the nominal brake shoe clearance in order to obtain a large volumetric displacement of hydraulic fluid with low air consumption. The pneumatic piston and consequently the hydraulic piston, which is formed on the end of the pneumatic piston, is therefore displaced a distance corresponding to the nominal stroke of the pneumatic/hydraulic piston. Following this, a second stage of operation is initiated by venting air from the one side of the larger pneumatic piston, which is integral with the smaller pneumatic piston. This results in a higher pneumatic to hydraulic force multiplication being obtained after the brake shoe clearance has been taken up, but with less air consumption since in the actuated position of the larger pneumatic piston, the volume of air existing on the one side of the piston is reduced to a minimum.

A slack adjuster piston in a reference chamber of the hydraulic portion operates between opposite end stops as the pneumatic/hydraulic piston is actuated through its nominal stroke, thereby displacing a predetermined amount of hydraulic fluid sufficient to take up the brake shoe clearance.

In the event brake shoe engagement occurs prematurely, such as during the initial application of the brakes following installation of new brake shoes, a high pressure is developed in the reference chamber due to brake shoe engagement occurring before complete displacement of hydraulic fluid has taken place. Accordingly, a one-way check valve between the reference chamber and a hydraulic reservoir is opened by the hydraulic pressure buildup, thereby displacing the excess hydraulic fluid from the reference chamber until the slack adjuster piston engages its one end stop. During a subsequent brake release, the brake shoes will be retracted as the slack adjuster piston is returned to its original position against its other end stop, thereby establishing the desired brake shoe clearance.

In the event overtravel occurs due to brake shoe wear, in which case hydraulic fluid in the reference chamber is completely displaced, consequent movement of the slack adjuster piston into engagement with the one end stop results in a one-way check valve opening a passageway through the slack adjuster piston via which passageway any additional hydraulic fluid necessary to maintain brake shoe engagement with shoe wear is supplied from the hydraulic cylinder. During a subsequent brake release, the slack adjuster piston is retracted to establish the desired brake shoe clearance, following which continued movement of the pneumatic-hydraulic piston to release position corresponding to overtravel during the preceding brake application draws makeup hydraulic fluid into the hydraulic cylinder from the hydraulic reservoir via another one-way check valve.

BRIEF DESCRIPTION OF THE DRAWING

The foregoing objects and additional advantages and features of the present invention will become apparent from the following more detailed explanation of the invention when taken in conjunction with the attendant single FIGURE drawing showing a sectional assembly view of a hydropneumatic actuator device, in which the pneumatic portion embodies a combined brake cylinder/air reservoir design and the hydraulic portion provides a double-acting slack adjuster.

DESCRIPTION AND OPERATION

In a preferred embodiment of the invention, there is shown a hydropneumatic brake actuator including a pneumatic portion 1 in the form of a combined brake cylinder/air reservoir device (such as disclosed in copending application Ser. No. 561,026, assigned to the assignee of the present invention) and a hydraulic portion 2. Pneumatic portion 1 comprises a main casting 3 having a partition forming a pressure head 4 with an opening 5 in pressure head 4. A back cover 6 is bolted to the one end of main casting 3 and an end casting 7 is bolted to the opposite end of main casting 3. A cylindrical tube 8 extends longitudinally between pressure head 4 and back cover 6, thereby forming an annular emergency chamber 9 about the outer periphery of tube 8. A fluted guide sleeve 10 is disposed within tube 8, such that its opposite ends also extend between pressure head 4 and back cover 6. Longitudinal passageways 11 are formed by the fluted sleeve 10 and tube 8. The guide sleeve 10 is aligned axially concentric with opening 5 and has an inside diameter substantially the same as the diameter of opening 5. Slidably disposed within guide sleeve 10 is a tubular-shaped positioning piston 12 that forms, in cooperation with sleeve 10 and back cover 6, a positioning chamber 13.

Positioning piston 12 includes a piston head 14 integral with a tubular-shaped, elongated body 15 that projects through opening 5 and to which is attached a power piston 16 having a diameter larger than the diameter of positioning piston 12. Being interconnected, positioning piston 12 and power piston 16 form a dual piston assembly that moves as a unit between a brake release position and a brake application position. A stop bumper 17 is carried by power piston 16 for engagement with pressure head 4 in the brake release position of the dual piston assembly, as shown. A cylindrical sleeve 18 is bolted to an inwardly projecting annular sleeve 19 of end casting 7 and carries on its outer periphery a sealing ring 20 with which the inner periphery of tubular-shaped body 15 is engageable during movement of the dual piston assembly.

An annular cylinder liner 21 is secured to main casting 3 between the main casting and end casting 7 to receive power piston 16. The inside diameter of cylinder liner 21 is substantially the same as the outside diameter of power piston 16. By unbolting end cover 7 from main casting 3, the piston assembly and cylinder liner may be withdrawn from the main casting and, if different braking power is desired, replaced with a piston assembly having a different sized power piston. A cylinder liner having a diameter corresponding to the replacement power piston may then be installed in main casting 3, as explained above, to accommodate the different sized power piston.

The end of cylinder liner 21 adjacent power piston 16 is spaced longitudinally from the power piston when the dual piston assembly is in release position, as shown. Until power piston 16 enters the cylinder liner 21 during an application stroke, free air flow between opposite sides of power piston 16 occurs. When the power piston enters the cylinder liner 21, an application chamber 22 is formed on one side of the power piston and a release chamber 23 is formed on the opposite side, it being understood that the combined volume of chambers 22 and 23 is substantially greater than the maximum volume of chamber 13. The volumetric dimension of chamber 13 increases by axial displacement of positioning piston 12 during movement of the dual piston assembly toward brake application position and is maximum in the application position. An annular pressure seal 24 is carried on the periphery of power piston 16 and makes sealing engagement with the cylinder wall of liner 21 to establish a pressure seal between chambers 22 and 23. In the release position shown, fluid pressure communication is established between chambers 22 and 23, by way of the space between piston 16 and the adjacent end of liner 21. At this point, chambers 22 and 23 are in effect, a single chamber, until piston 16 enters into sealing engagement with liner 21 during subsequent movement toward the brake application position.

A fluid pressure seal ring 25 is carried on pressure head 4 about the central opening 5, so as to engage the outer periphery of the tubular-shaped body 15 of positioning piston 12 and thereby maintain a pressure-tight seal between pressure chambers 22-23 and chamber 13. The fluid pressure seal ring 20 carried on the outer periphery of cylindrical sleeve 18 near its free end maintains a pressure-tight seal between chambers 22-23 and atmosphere.

A hollow piston rod 27 is connected, as by threads, at its one end to positioning piston 12 within tubular body 15. The other end of piston rod 27 is fixed, as by welding, to a hydraulic piston 28 that projects through a sealed opening 29 formed at the juncture of interconnected sleeves 18 and 19 and into a hydraulic chamber 30. Hydraulic chamber 30 is contained in a hydraulic cylinder 31 that is integral with end casting 7 and comprises hydraulic portion 2. A piston return spring 32 acts between the head 14 of positioning piston 12 and a spring seat 33 that abuts the seal end of sleeve 18 to urge the dual piston assembly toward release position.

A branch pipe 34 is connected between a brake pipe 35 and a mounting boss 36 that receives a control valve device 38, which may be similar to that described in U.S. Pat. No. 4,405,182. Mounting boss 36 includes a port 39 leading to emergency chamber 9, a port 40 leading to chamber 13 via fluted passageway 11, and ports 41, 42 leading to the respective application and release chambers 22, 23.

In addition to hydraulic chamber 30, hydraulic cylinder 31 also comprises a reference chamber 43 that is axially aligned with hydraulic chamber 30 and a hydraulic reservoir 44. A one-way check valve device 45, such as a conventional spring-biased ball check valve, is provided in a passage 46 between reservoir 44 and chamber 30 via which a source of hydraulic fluid is connected to the hydraulic system.

Operably disposed in reference chamber 43 is a slack adjuster piston 47 having a predetermined maximum stroke corresponding to the desired clearance to be maintained, for example, between the brake shoes (not shown) of a railway vehicle and the tread of the wheel to be braked (not shown). This predetermined maximum stroke of slack adjuster piston 47 is established by a stop at one end of chamber 43 formed by a shoulder 48 between chambers 30 and 43, and a stop at the other end of chamber 43 formed by a cover member 49 that closes this other end of the reference chamber 43. A return spring 50 between piston 47 and end cover 49 normally maintains the slack adjuster piston 47 in engagement with shoulder 48. Contained in a through passage 51 of slack adjuster piston 47 is a one-way check valve device 52, such as a conventional spring-biased ball check valve that is arranged to permit fluid flow in a direction from chamber 43 to chamber 30 when the force of fluid pressure in chamber 43 becomes substantially greater than the force required to open another one-way check valve 53. This one-way check valve device 53 may also be a conventional spring-biased ball check valve that is disposed in a passage 54 between chamber 43 and reservoir 44. A pin 55 is set in cover member 49 so as to project into chamber 43 to engage and unseat the spring-loaded ball valve of one-way check valve 52 when slack adjuster piston 47 is in engagement with its stop provided by cover member 49. An outlet 56 is provided in cover member 49 via which hydraulic fluid is transmitted from chambers 30, 43 to an output device, such as the wheel brake cylinders (not shown), to which the aforementioned brake shoes may be attached. A high pressure, annular seal 57 is provided in the piston bore of chamber 43 between passage 54 and outlet 56 to isolate these passages when piston 47 is in its extreme right-hand position.

During initial charging of the brake equipment, pressure chambers 9, 22 and 23 are stored with compressed air supplied by way of brake pipe 35, branch pipe 34, control valve device 38, and the respective ports 39, 41 and 42 of main casting 3. The dual piston assembly comprising positioning piston 12 and power piston 16 is maintained in release position, as shown, under the influence of return spring 32.

In order to initiate a service brake application, air in brake pipe 35 is reduced at a service rate. During the initial stage of a service brake application, control valve 38 is operative in response to the brake pipe pressure reduction to connect compressed air from charged chambers 22 and 23 to the previously evacuated positioning chamber 13. As this air pressure in positioning chamber 13 builds up in attempting to equalize with the higher air pressure in chambers 22 and 23, a force is developed on positioning piston 12 in a right-hand direction. When this force exceeds the force of return spring 32, the dual piston assembly will be forced in a brake application direction, carrying along piston rod 27. During this movement of the dual piston assembly, unrestricted flow of compressed air takes place from release chamber 23 to application chamber 22 via the space between the power piston 16 and the adjacent end of cylinder liner 21 to accommodate the displacement of power piston 16. A one-way check valve (not shown) is also provided in control valve device 38 to accommodate displacement of air from release chamber 23 to application chamber 22 when piston 16 makes full sealing engagement with cylinder liner 21, as the dual piston assembly moves toward full application position.

As piston rod 27 is moved from release to application position, hydraulic piston 28 is forced into hydraulic chamber 30, thereby displacing hydraulic fluid via outlet 56 to force the vehicle brake shoes into braking engagement, as hereinafter described more fully. Consequently, brake shoe clearance is taken up with a low brake force requirement during this initial stage of a service brake application.

It will be further appreciated that in application position of power piston 16, the volume of application chamber 22 is increased and the volume of release chamber 23 is decreased. In the second stage of this service brake application, the air in the reduced volume of chamber 23 is exhausted by control valve 38 an amount corresponding to the reduction of air pressure in brake pipe 38. The resultant reduction of pressure in release chamber 23 establishes a relatively high differential force across power piston 16 in a brake application direction, since the pressure in chamber 22 is prevented from equalizing with the pressure in chamber 23 by seal ring 24. This high pneumatic force is transmitted to the brake shoes via the hydraulic fluid in the brake circuit, which in effect becomes a solid link once brake shoe clearance has been taken up.

During a subsequent brake release operation, air in release chamber 23 is initially connected by control valve device 38 to chamber 22 via a release control choke (not shown) in control valve device 38 to assure a controlled release of braking force. Concurrently, the pressure in positioning chamber 13 is vented to atmosphere. As the pressures across power piston 13 become equalized, return spring 25 is effective to force the dual piston assembly toward the release position. Once power piston 13 moves out of engagement with cylinder liner 16, unrestricted flow of air occurs between chambers 22 and 23 to hasten movement of the dual piston assembly and the car brake shoes to the release position. As the dual piston assembly is retracted, so is hydraulic piston 28, which relieves the hydraulic brake pressure to permit the brake shoes to be retracted from engagement with the wheel tread braking surface. In this release position, the brake shoes are spaced-apart from the wheel tread brake surface a distance corresponding to the desired brake shoe clearance, as maintained by operation of the hydraulic slack adjuster to be now explained.

It will be appreciated that the two-stage operation of the pneumatic portion 1 minimizes air usage by initially taking up the brake shoe clearance through the use of a relatively small positioning piston 12 and subsequently obtaining the desired high braking forces by venting air from one side of a relatively large power piston 16 that is connected to the positioning piston 13. Since only low force is required to move the brake shoes into engagement with the braking surface of the wheel treads through the brake shoe clearance, which constitutes the entire piston stroke, a reduced air requirement is realized, as compared to arrangements employing a single, large piston. In addition, the high force output required for obtaining the desired brake force is obtained by venting only a minimum of air from the release chamber 23, since in the application position, the volume of this chamber 23 has been reduced to a minimum size.

In the present invention, the pneumatic output force realized is converted into hydraulic pressure through hydraulic piston 28, which eliminates the need for mechanical brake rigging to obtain the desired output forces.

In order to maintain maximum efficiency of the pneumatic portion 1 with respect to air consumption, hydraulic portion 2 is provided with a double-acting slack adjuster arrangement to maintain the brake shoe clearance at a predetermined value.

During the initial stage of operation of pneumatic portion 1, hydraulic piston 28 advances into hydraulic chamber 30 as the dual piston assembly comprising pistons 12 and 16 advances toward brake application position. During this stroke of the dual piston assembly, sufficient hydraulic fluid in hydraulic chamber 30 is displaced to force slack adjuster piston 47 from its normal or release position against shoulder 48 rightwardly into engagement with cover member 49. During this displacement of slack adjuster piston 47, the hydraulic fluid in reference chamber 43 is forced to flow to the vehicle brake circuit via outlet 56. The volume of hydraulic fluid displaced from reference chamber 43 is selected such that the predetermined brake shoe clearance will be taken up by movement of the brake shoes into brake engagement with the wheel treads. It will be understood that during takeup of this brake shoe clearance, the force buildup in reference chamber 43 is relatively low, since brake shoe/wheel engagement has not yet occurred. This force buildup is less than the force required to overcome the spring bias of one-way check valve 53, which accordingly remains closed to prevent hydraulic fluid from being forced into reservoir 44. Thus, the hydraulic fluid is forced to flow via outlet 56 to the vehicle brake circuit.

In the event brake shoe/wheel engagement occurs before the hydraulic fluid in reference chamber 43 is completely displaced, due to premature brake shoe engagement, as would be the case in applying the brakes following installation of new brake shoes, for example, the pressure of the remaining hydraulic fluid in reference chamber 43 will increase sufficiently to overcome the spring bias and open one-way check valve 53 to allow the excess hydraulic fluid previously accumulated in the hydraulic brake circuit during wear-out of the replaced brake shoes to pass into reservoir 44. As this occurs, slack adjuster piston 47 will reach its rightward-most position abutting cover member 49. It should be mentioned at this point that the spring bias of one-way check valve 52 in slack adjuster piston 47 is greater than the spring bias of one-way check valve 53 to prevent back-flow of hydraulic fluid from chamber 43 to chamber 30 during this time.

In this rightward-most position of slack adjuster piston 47, annular seal 57 engages the skirt of piston 47 to isolate any further flow of high pressure hydraulic fluid into reservoir 44 via one-way check valve 53. Concurrently, one-way check valve device 52 carried by piston 47 engages projecting pin 55 to cause the spring-biased ball valve to open. This allows additional hydraulic fluid to be delivered from hydraulic chamber 30 to the vehicle brake circuit via the open one-way check valve 52 and outlet 56, in the event overtravel of the dual piston assembly occurs due to brake shoe wear.

During a subsequent brake release, hydraulic piston 28 is retracted with the dual piston assembly under the influence of return spring 32, thereby relieving the high pressure developed in hydraulic chamber 30 during the preceding brake application. This permits return spring 50 to force slack adjuster piston 47 in a leftward direction out of engagement with cover member 49, whereby the ball check valve of one-way check valve device 52 is closed by its bias spring. As slack adjuster piston 47 is shifted back to its normal release position into engagement with shoulder 48, hydraulic fluid in the braking circuit is drawn back into reference chamber 43, thereby allowing the brake shoes to be retracted from the wheel tread braking surfaces. The volume of hydraulic fluid returned to reference chamber 43 is such that the predetermined brake shoe clearance is established.

The dual piston assembly and hydraulic piston 28 continue to be retracted toward release position a distance corresponding to any overtravel accumulated during brake application.

Since slack adjuster piston 47 is prevented from following hydraulic piston 28 during this period of the release stroke, a low pressure is created in chamber 30 sufficient to open check valve device 45 to admit makeup hydraulic fluid to flow from reservoir 44 to chamber 30 via passageway 46 and one-way check valve device 45 until complete retraction of the dual piston assembly occurs, as determined by engagement of bumpers 17 with pressure head 4. It will be understood at this point that the spring bias of check valve device 52 is substantially greater than that of check valve device 45 so that back-flow of hydraulic fluid from chamber 43 to chamber 30 cannot occur as this makeup hydraulic fluid is drawn into chamber 30. Accordingly, brake shoe wear is automatically compensated to maintain a predetermined brake shoe clearance and thereby assure the optimum operating characteristic of pneumatic portion 1.

Having now described the invention, what I claim as new and desire to secure by Letters Patent, is:

1. A hydropneumatic actuator device comprising:
   (a) a pneumatic cylinder;
   (b) a dual piston assembly operatively disposed in said pneumatic cylinder for axial movement between a release position and an application position defining a predetermined stroke including:
      (i) a positioning piston cooperating with said pneumatic cylinder to form a first chamber on one side of said positioning piston, pressurization of said one chamber producing a differential force on said positioning piston in the direction of said application position;
      (ii) a power piston interconnected with said positioning piston for joint operation therewith, said power piston cooperating with said pneumatic cylinder to form second and third chambers on the opposite sides of said power piston in which compressed air is normally stored in said release position of said dual piston assembly, one of said second and third chambers being vented in said application position of said dual piston assembly to provide a force differential across said power piston in the direction of said application position;
   (c) a reservoir in which hydraulic fluid is stored;
   (d) a hydraulic cylinder having an inlet via which hydraulic fluid is supplied to said hydraulic cylinder from said reservoir, and an outlet;
   (e) a hydraulic piston connected to said dual piston assembly and operably disposed in said hydraulic cylinder to displace hydraulic fluid in accordance with movement of said dual piston assembly between said release and application positions; and
   (f) double-acting slack adjuster means for adjusting the amount of hydraulic fluid in said hydraulic cylinder in accordance with overtravel and undertravel of said dual piston assembly to maintain said predetermined stroke thereof constant, said slack adjuster means comprising:
      (i) a pair of axially spaced end stops located in said hydraulic cylinder between said inlet and outlet;
      (ii) a slack adjuster piston reciprocally disposed in said hydraulic cylinder between said pair of end stops, one side of said slack adjuster piston forming in cooperation with said hydraulic cylinder a reference chamber;

(iii) a first passageway in said slack adjuster piston via which hydraulic fluid in said hydraulic cylinder is connected to said reference chamber;

(iv) a first one-way check valve in said first passageway to prevent flow of hydraulic fluid from said hydraulic cylinder to said reference chamber during movement of said slack adjuster piston from said other end stop into engagement with said one end stop, whereby a predetermined amount of hydraulic fluid is displaced from said reference chamber via said outlet;

(v) a pin projecting from said one end stop into said reference chamber so as to engage and thereby open said first one-way check valve in response to movement of said slack adjuster piston a distance corresponding to said predetermined stroke of said dual piston assembly, whereby an additional amount of hydraulic fluid in excess of said predetermined amount is displaced from said hydraulic cylinder via said first passageway;

(vi) a second one-way check valve in said inlet via which makeup hydraulic fluid is drawn from said reservoir into said hydraulic cylinder in response to movement of said dual piston assembly toward said release position following engagement of said slack adjuster piston with said other end stop to thereby compensate for said overtravel of said dual piston assembly during the preceding movement thereof toward said application position;

(vii) a second passageway between said reservoir and said reference chamber;

(viii) a third one-way check valve in said second passage via which hydraulic fluid in said reference chamber flows into said reservoir when a predetermined back pressure develops at said outlet prior to said slack adjuster piston engaging said one end stop during operation of said dual piston assembly toward said application position to thereby compensate for said undertravel of said dual piston asembly; and (ix) an annular seal in said reference chamber between said outlet and said second passageway with which said slack adjuster piston is engageable at substantially the same time that said first one-way check valve is opened by said pin on engagement thereof with said one end stop.

2. A hydropneumatic actuator device, as recited in claim 1, wherein said hydraulic piston comprises a push rod and connected at one end to one of said positioning and power pistons and having the opposite end projecting into said hydraulic cylinder through a sealed opening therein.

3. A hydropneumatic actuator device, as recited in claim 1, wherein the amount of said makeup fluid corresponds to said additional amount of hydraulic fluid in excess of said predetermined amount.

4. A hydropneumatic actuator device, as recited in claim 1, wherein said first and second one-way check valves are biased in a closed direction to prevent hydraulic fluid flow from said hydraulic cylinder to said reservoir and to said reference chamber respectively, the bias of said first one-way check valve being greater than the bias of said second one-way check valve.

5. A hydropneumatic actuator device, as recited in claim 1, wherein said first and third one-way check valves are normally biased in a closed direction to prevent fluid flow from said hydraulic chamber to said reference chamber, and from said reference chamber to said reservoir respectively, the bias of said first one-way check valve being greater than the bias of said third one-way check valve.

6. A hydropneumatic actuator device, as recited in claim 1, further comprising means for urging said dual piston assembly toward said release position.

7. A hydropneumatic actuator device, as recited in claim 6, further comprising stop means for limiting axial movement of said dual piston assembly in a direction to establish said release position.

8. A hydropneumatic actuator device, as recited in claim 7, wherein said one and said other of said pair of end stops are spaced-apart from each other a distance corresponding to said predetermined stroke of said dual piston assembly whereby said application position of said dual piston assembly is established in accordance with engagement of said slack adjuster piston with said one end stop.

* * * * *

UNITED STATES PATENT AND TRADEMARK OFFICE
CERTIFICATE OF CORRECTION

PATENT NO. : 4,619,348
DATED : October 28, 1986
INVENTOR(S) : Eric G. Smith

It is certified that error appears in the above–identified patent and that said Letters Patent are hereby corrected as shown below:

Column 10, Claim 2, line 6, delete "and"

Signed and Sealed this

Tenth Day of February, 1987

*Attest:*

DONALD J. QUIGG

*Attesting Officer*   *Commissioner of Patents and Trademarks*